R. WAGNER.
OPERATING MECHANISM FOR OSCILLATORY IGNITION MACHINES.
APPLICATION FILED DEC. 16, 1912.
1,123,436.
Patented Jan. 5, 1915.
2 SHEETS—SHEET 1.
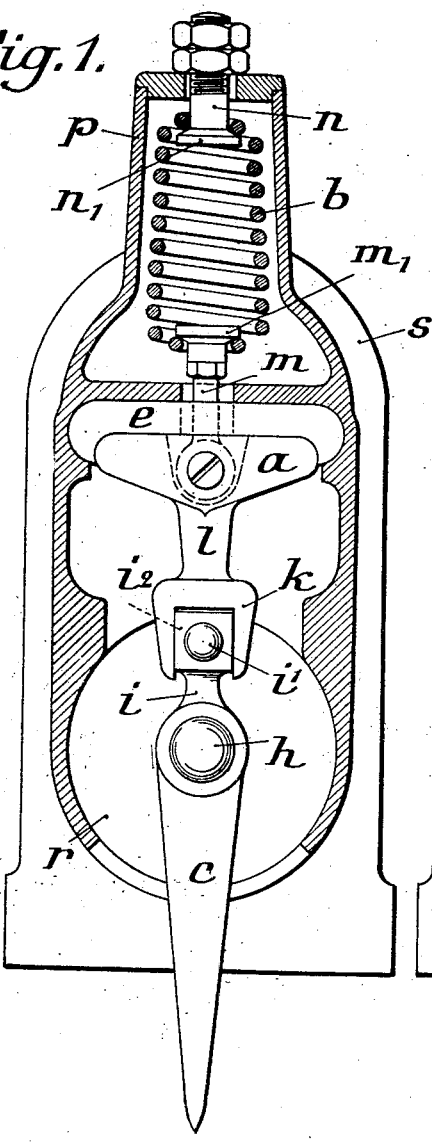
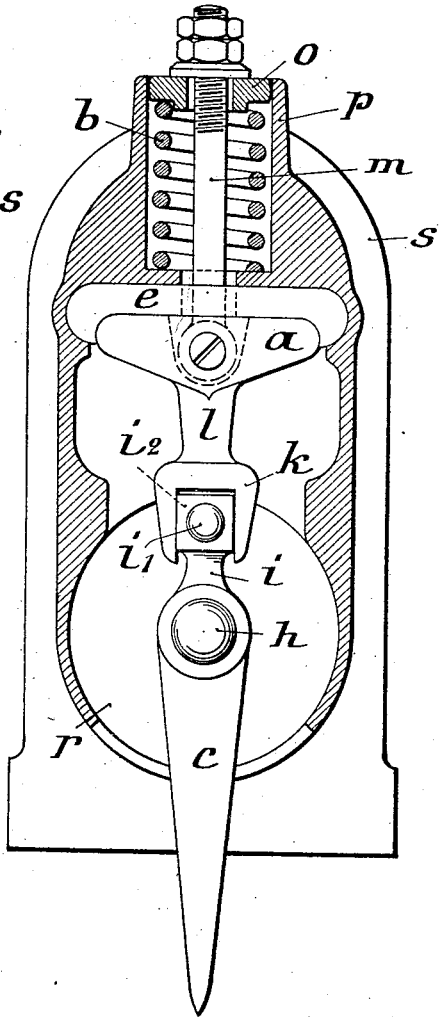

R. WAGNER.
OPERATING MECHANISM FOR OSCILLATORY IGNITION MACHINES.
APPLICATION FILED DEC. 16, 1912.
1,123,436.
Patented Jan. 5, 1915.
2 SHEETS—SHEET 2.
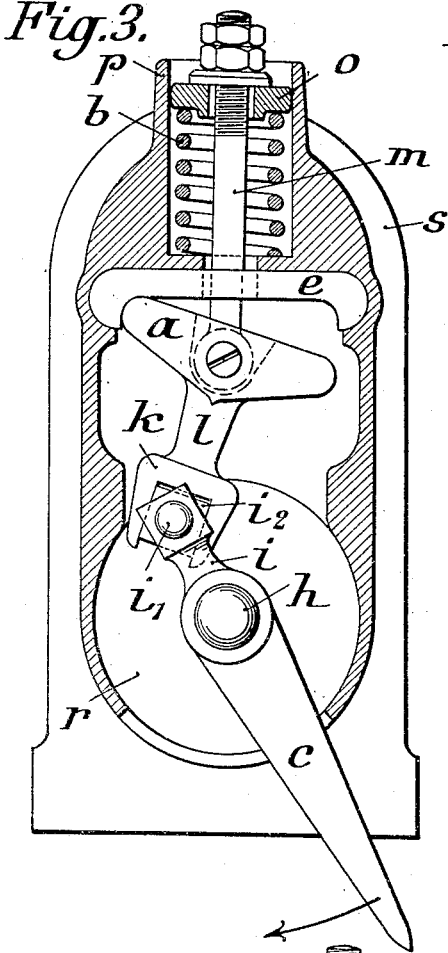
Fig. 3.
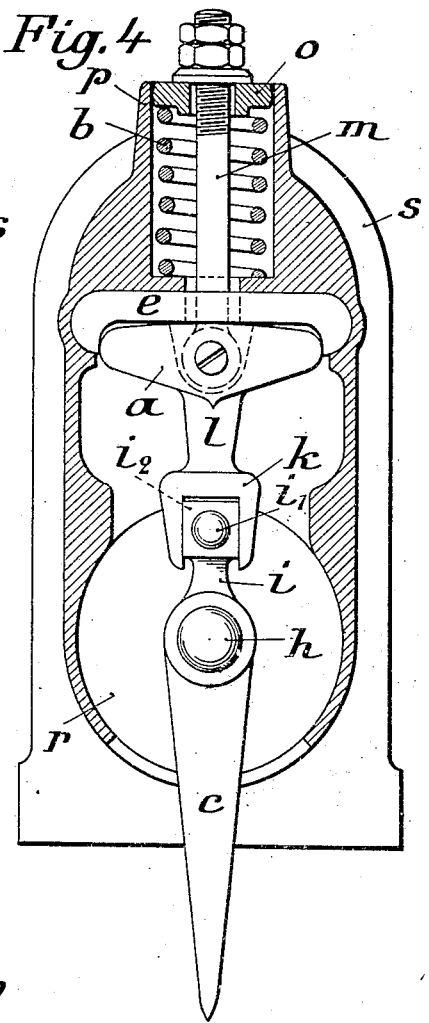
Fig. 4.
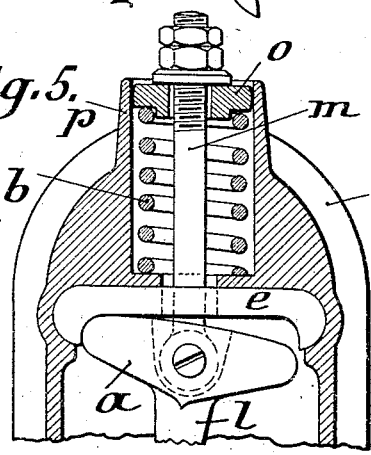
Fig. 5.
Fig. 6.
WITNESSES
INVENTOR
Robert Wagner

UNITED STATES PATENT OFFICE.

ROBERT WAGNER, OF STUTTGART, GERMANY, ASSIGNOR TO THE FIRM OF ROBERT BOSCH, OF STUTTGART, GERMANY

OPERATING MECHANISM FOR OSCILLATORY IGNITION-MACHINES.

1,123,436.   Specification of Letters Patent.   Patented Jan. 5, 1915.

Application filed December 16, 1912. Serial No. 736,935.

*To all whom it may concern:*

Be it known that I, ROBERT WAGNER, a subject of the Emperor of Germany, residing at and whose post-office address is Seestrasse 4, Stuttgart, Germany, have invented certain new and useful Improvements in Operating Mechanism for Oscillatory Ignition-Machines; and I do hereby declare the following to be a full, clear, and exact description of the invention, such as will enable others skilled in the art to which it appertains to make and use the same.

The present invention relates to operating mechanism for oscillating a movable member of an ignition machine to produce sparking voltages for igniting the combustible gases in internal combustion engines, and more particularly to mechanism of this kind in which the energy stored in the spring is operatively transmitted therefrom to the oscillatory member of the ignition machine through a rolling contact in contradistinction to a sliding contact.

According to the invention, the operating spring is connected to the operating lever by an intermediate member capable of movement relatively to its guide or support by a pure rolling motion. The intermediate member is provided with a shaped-surface held by the spring in constant engagement with a shaped-surface of an abutment, and is pivoted to the operating lever in such manner that the sliding movement at this pivot, resulting from the deflection of the operating lever, does not interfere with the pure rolling motion on the guide. Furthermore, the arrangement is such that the stress transmitted to or from the operating spring is in substantially a constant direction throughout substantially the entire deflection of the operating lever. The provision of an intermediate member between the operating lever and the operating spring is also advantageous in that the variation of turning moment exerted on the oscillatory member of the ignition machine may be graduated as desired, either by altering the contour of the rolling surfaces or by altering the ratio of the effective lengths of the operating lever and the intermediate member. In this way, any desired part of the rolling contact surface can be used, or the rapid variation of turning moment can be effected throughout any desired range of the positions of the operating handle.

In the accompanying drawings, illustrating the preferred form and several modifications of my invention, Figures 1 and 2 represent in front elevation, partly in section, two modifications of the operating mechanism; Fig. 3 represents the modification of Fig. 2 with the operating lever deflected; Fig. 4 represents the preferred form of construction in front elevation, partly in section; Fig. 5 represents a partial view of the preferred form with the operating lever deflected, and Fig. 6 represents the variation of turning moment produced by the construction shown in Figs. 4 and 5.

Referring to the drawings, the operating lever $c$ is secured in the usual manner upon the shaft $h$ carrying the oscillatory member of the ignition machine $s$, and the part $i$ thereof is extended beyond the shaft into a fork-shaped piece spanned by a pin $i_1$, upon which the bearing block $i_2$ is rotatably mounted. The block $i_2$ is embraced by the fork-shaped end $k$ of the intermediate member or link $l$ which carries at the other end the cam $a$ either integral with it or rigidly fastened to it. A draft rod $m$ for the spring $b$ is pivotally connected at the middle of the cam $a$ and passes through an opening in the fixed abutment $e$.

In Fig. 1, a short draft rod $m$ connects one end of the spring $b$ to the cam $a$, while the adjustable rod $n$ connects the other end of the spring to a fixed part of the ignition machine $s$. The rods $m$ and $n$ are provided with enlarged heads $m_1$, $n_1$ resting within the end convolutions of the spring. In Fig. 2, the adjustable draft rod $m$ extends through the spring $b$ and rests upon a disk $o$ which is arranged to slide within the fixed guide $p$.

When the operating lever $c$ is deflected from its normal position of rest, shown in Figs. 1 and 2, to the position shown in Fig. 3, the cam $a$ assumes an inclined position, thereby stressing the spring $b$ by tensioning it in Fig. 1 and by compressing it in Fig. 2. The spring then strongly tends to snap the cam $a$ and the operating lever $c$ back to their normal positions of rest by a pure rolling motion between the shaped-surface of the cam $a$ and the coöperating shaped-surface of the abutment $e$. This action occurs as soon as the operating lever is released from its deflected position, and the rapid movement of the oscillatory member $r$ of the ignition machine $s$ generates a sparking voltage suitable for use in connection with ignition systems for igniting the combustible mixtures in the internal combustion engines with which the machine is intended to be associated.

Figs. 4 and 5 are like the previous forms of construction except that the shaped-surface of the cam $a$ is arched, thereby producing a single line of contact when the cam is in its position of rest. This results in the effect that during a small deflection of the operating lever, as shown in Fig. 5, the turning moment on the oscillatory member of the ignition machine increases at a comparatively low rate, while as soon as the curved end portion of the cam $a$ comes into contact with the abutment $e$, the turning moment increases at a higher rate. The characteristic variation of the turning moment with the deflection of the operating handle is indicated by Fig. 6, wherein the abcissæ are proportional to the deflection, and the ordinates are proportional to the turning moment.

When the operating lever of Fig. 4 is released from it fully deflected position, the spring $b$ produces a strong and rapid movement of the oscillatory member $r$, without the curved portions of the cam $a$ striking violently against the abutment at any point. In this way the pressure between the contact surfaces is mildly and elastically taken up, and only purely rolling friction occurs between them. Furthermore, the stress transmitted to or from the operating lever is in substantially constant direction throughout substantially the entire deflection of the operating lever.

The contact surface at the portion intermediate the ends of the abutment is shown flat in the drawings, merely as an example, while the contact surface of the cam is shown curved at the ends with a flat or arched intermediate portion. It is apparent, however, that the contour of the coöperating contact surfaces can be modified in various ways to accomplish desired results. For instance, the contact surface of the cam may be flat, and that of the abutment arched. Also, the contour of one of the coöperating surfaces may be concave and the other convex, in which case the convex surface should have the shorter radius.

When the arm $i$ and intermediate member $l$ are disposed on the opposite side of the shaft $h$ from the part $c$ of the operating lever, the deflection of the cam $a$ for a given deflection of the operating lever varies directly with the length of the arm $i$ and inversely with the length of the intermediate member $l$. Also, with a comparatively short arm $i$, only a part of the rolling contact surfaces will be utilized, so that the turning moment on the oscillatory member of the ignition machine increases but slowly, while if the arm $i$ is comparatively long, the tipping action of the cam $a$ occurs after the completion of the rolling movement, and therefore the turning moment attains comparatively high values, as may be noted in Fig. 6.

Having thus described my invention, what I claim is:

1. In operating mechanism for oscillatory ignition machines, an operating lever, an operating spring, a fixed abutment, and a cam in rolling engagement with the abutment, the operating lever being pivotally connected to the cam to displace it by a rolling motion when the lever is deflected, and the cam being operatively connected to the spring to stress it when the cam is displaced; substantially as described.

2. In operating mechanism for oscillatory ignition machines, an operating lever, an operating spring, an abutment having a shaped-surface, a cam having a shaped-surface in rolling engagement with the shaped surface of the abutment, a draft rod connected to the spring and pivoted to the cam in such manner as to draw the cam into engagement with the abutment, and an operative connection between the cam and the operating lever whereby the deflection of the lever displaces the cam and stresses the spring; substantially as described.

3. In operating mechanism for oscillatory ignition machines, an operating lever, an operating spring, an abutment having a shaped-surface, a cam having a shaped-surface in rolling engagement with the shaped-surface of the abutment, a draft rod connected to the spring and passing through an opening in the abutment to a pivoted connection near the middle of the cam in such manner as to draw the cam into engagement with the abutment, and an operative connection between the cam and the operating lever whereby the deflection of the lever displaces the cam and stresses the spring; substantially as described.

4. In operating mechanism for oscillatory ignition machines, an operating lever connected to the oscillatory member of the ignition machine, an operating spring, an abutment having a shaped-surface, a cam having a shaped-surface in rolling engagement with the shaped-surface of the abutment, a connection between the spring and the cam for holding the cam in engagement with the abutment, and a lever carried by the cam and pivotally connected to the operating lever, whereby the deflection of the operating lever displaces the cam and stresses the spring; substantially as described.

5. In operating mechanism for oscillatory ignition machines, an operating lever, an operating spring, an abutment having a shaped-surface, and a cam having a shaped-surface in rolling engagement with the shaped surface of the abutment, said shaped-surfaces engaging along a single line when the cam is in its normal position of rest, and the operating lever being operatively connected to the cam to displace it when the lever is deflected and the cam being operatively connected to the spring to stress it when the cam is displaced; substantially as described.

6. In operating mechanism for oscillatory ignition machines, an operating lever connected to the oscillatory member of the ignition machine, an abutment having a shaped-surface, a cam held in engagement with the abutment by the spring and having a shaped-surface including curved ends of shorter radius than the intermediate portion in rolling engagement with the shaped-surface of the abutment, and mechanism interposed between the cam and the operating lever and arranged in such manner relatively to the coöperating shaped-surfaces that the cam tips upon one of its curved ends after a predetermined deflection of the operating lever; substantially as described.

7. In operating mechanism for oscillatory ignition machines, an operating lever connected to the oscillatory member of the ignition machine, an operating spring, a fixed abutment having a shaped-surface, a cam having a shaped-surface with curved ends of shorter radius than the intermediate portion and so shaped relatively to the shaped-surface of the abutment as to be in rolling engagement therewith and to have a single line of contact when the operating lever is in its normal position of rest, a draft rod connected to the spring and passing through an opening in the abutment to a pivoted connection near the middle of the cam in such manner as to draw the cam into engagement with the abutment, and a lever carried by the cam and pivotally connected to the operating lever; substantially as described.

In testimony whereof I affix my signature, in presence of two witnesses.

ROBERT WAGNER.

Witnesses:
PAUL WOLFART,
HERMANN SCHNEIDER.

Copies of this patent may be obtained for five cents each, by addressing the "Commissioner of Patents, Washington, D. C."